(12) United States Patent
Hong et al.

(10) Patent No.: US 10,203,056 B2
(45) Date of Patent: Feb. 12, 2019

(54) HIGH-PRESSURE TOLERANT INTEGRATED LEAKAGE-PROOF SLEEVE COMPENSATOR

(71) Applicant: JIANGSU BEITE PIPE FITTINGS CO., LTD., Taizhou (CN)

(72) Inventors: Lei Hong, Taizhou (CN); Liang Hong, Taizhou (CN); Aichun Zhu, Taizhou (CN); Guangjin Cao, Taizhou (CN); Minghua Yin, Taizhou (CN)

(73) Assignee: JIANGSU BEITE PIPE FITTINGS CO., LTD., Taizhou (CN)

( * ) Notice: Subject to any disclaimer, the term of this patent is extended or adjusted under 35 U.S.C. 154(b) by 163 days.

(21) Appl. No.: 15/316,520

(22) PCT Filed: Oct. 11, 2014

(86) PCT No.: PCT/CN2014/088345
§ 371 (c)(1),
(2) Date: Dec. 6, 2016

(87) PCT Pub. No.: WO2015/184716
PCT Pub. Date: Dec. 10, 2015

(65) Prior Publication Data
US 2017/0152976 A1 Jun. 1, 2017

(30) Foreign Application Priority Data

Jun. 6, 2014 (CN) .......................... 2014 1 0250825

(51) Int. Cl.
*F16L 27/08* (2006.01)
*F16L 57/06* (2006.01)
(Continued)

(52) U.S. Cl.
CPC .......... *F16L 27/0824* (2013.01); *F16L 21/04* (2013.01); *F16L 27/08* (2013.01); *F16L 51/00* (2013.01); *F16L 57/06* (2013.01)

(58) Field of Classification Search
CPC ....... F16L 21/04; F16L 27/0824; F16L 27/08; F16L 27/0804; F16L 57/00; F16L 57/06
(Continued)

(56) References Cited

U.S. PATENT DOCUMENTS 1,518,368 A * 12/1924 Steed ................... F16L 27/0832
285/106
2,817,543 A * 12/1957 Corsette .............. F16L 27/0824
285/181
(Continued)

FOREIGN PATENT DOCUMENTS

CN 201078532 6/2008
CN 101545539 9/2009
(Continued)

*Primary Examiner* — Aaron M Dunwoody
(74) *Attorney, Agent, or Firm* — Treasure IP Group, LLC

(57) ABSTRACT

The present invention relates to a high-pressure-resistant integrated leakage-free rotating compensator, comprising an inner pipe, an outer sleeve, a connecting pipe and a filler flange. The outer sleeve is arranged on the inner pipe in a sleeved mode. One end of the inner pipe is inserted into the connecting pipe through the outer sleeve. The filler flange is arranged on the inner pipe in a sleeved mode. One end of the filler flange extends into the outer sleeve. An annular inner boss is arranged on the inner surface of the outer sleeve. The portion between the annular inner boss and the end, extending into the outer sleeve, of the filler flange is arranged on gland packing. The outer sleeve and the connecting pipe are of an integrally-formed integrated structure. An anti-impact plate is arranged between the gland packing and the annular inner boss.

7 Claims, 5 Drawing Sheets

Figure 1:
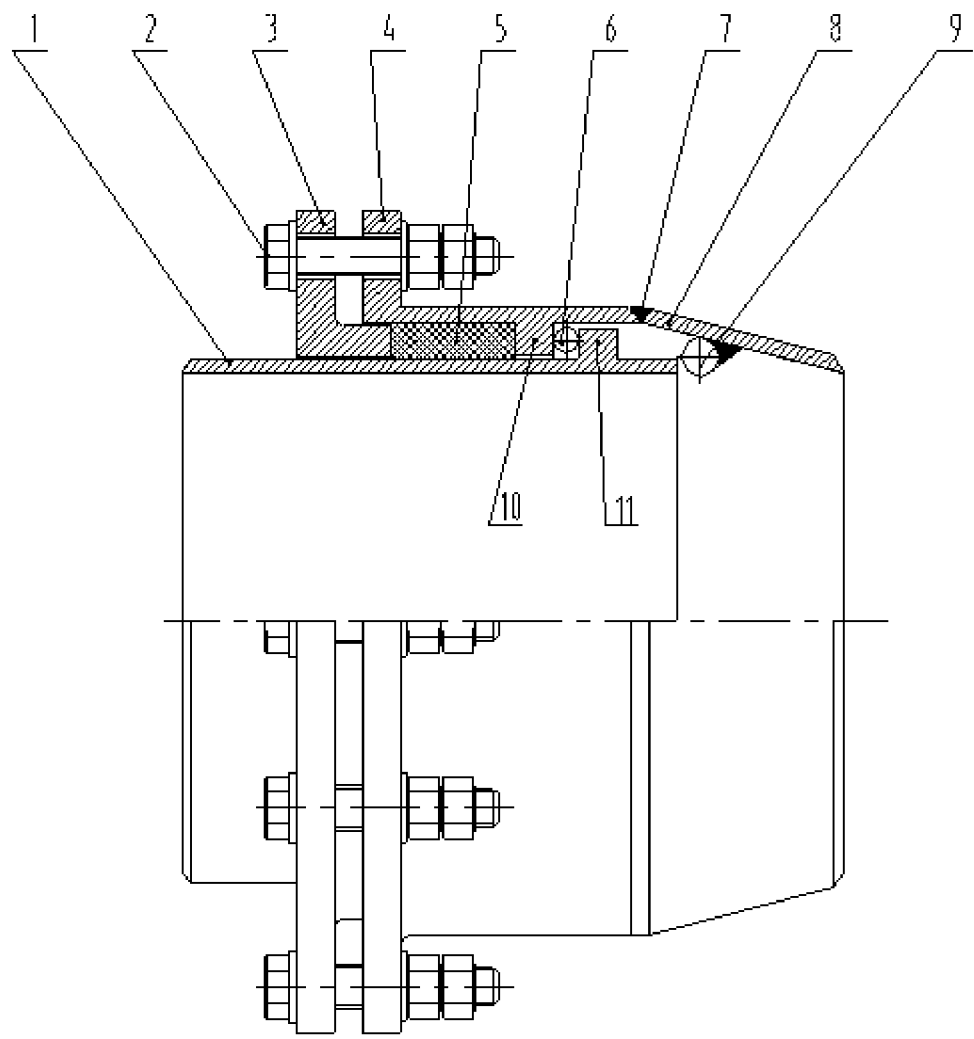

(51) Int. Cl.
*F16L 51/00* (2006.01)
*F16L 21/04* (2006.01)

(58) Field of Classification Search
USPC .......................... 285/113, 98, 276, 278, 280
See application file for complete search history.

(56) References Cited

U.S. PATENT DOCUMENTS

| | | | | | |
|---|---|---|---|---|---|
| 2,833,568 | A | * | 5/1958 | Corsette | F16L 27/0832 285/281 |
| 3,473,832 | A | * | 10/1969 | Kreidel | F16L 27/0832 285/281 |
| 3,679,235 | A | * | 7/1972 | Faccou | F16L 27/0824 285/14 |
| 7,891,711 | B2 | * | 2/2011 | Song | F16L 27/125 285/108 |

FOREIGN PATENT DOCUMENTS

| | | |
|---|---|---|
| CN | 102102784 A | 6/2011 |
| CN | 201934808 | 8/2011 |
| CN | 102996962 | 3/2013 |
| CN | 203023719 | 6/2013 |
| CN | 203585864 | 5/2014 |
| CN | 103994296 | 8/2014 |
| CN | 104019313 | 9/2014 |

\* cited by examiner

HIGH-PRESSURE TOLERANT INTEGRATED LEAKAGE-PROOF SLEEVE COMPENSATOR

BACKGROUND

Technical Field of the Invention

The present invention relates to a high-pressure resistant integrated leak-free rotary compensator.

Description of the Related Art

Pipes used in the electric, petroleum, chemical and thermal power industries, etc. usually need to be equipped with compensation devices. Existing compensation devices include rotary compensators, ripple compensators, sleeve compensators, spherical compensators, etc., which are used for compensating for the axial and radial displacement of pipes. When high-temperature and high-pressure media are delivered in the pipes, high requirements are imposed on rotary compensators, including sufficient displacement compensation, good sealing performance and longer service life.

An outer sleeve and a connecting pipe of an existing rotary compensator are butt-jointed by welding (see FIG. 1), for example Chinese patents 98227061.5, 02258709.8, 200620077450.1, 201120064777.6, 201110163209.6 and 201010598173.X. Through study, the applicant found that such butt-welding mode inevitably results in partial overlapping of an annular weld, between an outer sleeve and the connecting pipe, with an inner pipe, and it is difficult to accurately detect the welding quality by means of non-destructive detection using X rays, etc., thus there is no guarantee for the weld quality. For this reason, a related national standard GB/T150.4-2011 specifies that "For the last annular closed welding of a cylinder, with an inner diameter not exceeding 800 mm, and an end socket, a single-face welding butt-joint without a cushion shall be used, and when X-ray or ultrasonic testing fails, it is allowed to save the testing, but gas protective welding for priming is needed." The national standard has regulations on the welding process of the outer sleeve and the connecting pipe, but the welding quality of the outer sleeve and the connecting pipe still cannot be ensured. When a rotary compensator is applied to a high-temperature and high-pressure pipe, the quality has a direct relationship with human safety.

Through study, the applicant also found that the rotary compensator needs to work for a long time after being installed in a pipe and that its maximum service time can reach 30 years. During long-time use, the gland packing between the outer sleeve and the inner pipe has losses (more obvious when the delivered media are high-temperature and high-pressure media) after the long-term impact by the delivered media, resulting in a decline in the sealing effect or malfunction, thus affecting the sealing performance of the whole rotary compensator.

Through study, the applicant also found that the rotary compensator needs to work for a long time after being installed in a pipe and that its maximum service time can reach 30 years. During long-time use, the gland packing between the outer sleeve and the inner pipe has losses (more obvious when the delivered media are high-temperature and high-pressure media) due to the relative rotation of the outer sleeve and the inner pipe, resulting in a decline in the sealing effect or malfunction, thus affecting the sealing performance of the whole rotary compensator.

Therefore, thoroughly eliminating the potential safety hazards of the rotary compensator caused by butt-welding of the outer sleeve and the connecting pipe, solving the problem of a decline in sealing effect or malfunction caused by losses of the gland packing between the outer sleeve and the inner pipe after long-term impact by the delivered media, which affects the sealing performance of the whole rotary compensator, and solving the problem of decline in the sealing effect or malfunction caused by losses of the gland packing due to the relative rotation of the outer sleeve and the inner pipe, which affects the sealing performance of the whole rotary compensator, are key objectives of those skilled in this field.

SUMMARY OF THE PRESENT INVENTION

The present invention mainly solves the following technical problems:
  a. Potential safety hazards are caused by butt-welding of outer sleeves and connecting pipes of the existing pipe rotary compensators.
  b. During long-term use of the rotary compensator, losses of the gland packing between the outer sleeve and the inner pipe caused by the long-term impact by the delivered media result in a decline in the sealing effect or malfunction, thus affecting the sealing performance of the whole rotary compensator.
  c. Losses of the gland packing caused by the relative rotation of the outer sleeve and the inner pipe result in a decline in the sealing effect or malfunction, thus affecting the sealing performance of the whole rotary compensator.

To solve the above technical problems, the present invention employs the following technical solution:

A high-pressure resistant integrated leak-free rotary compensator consists of an inner pipe, an outer sleeve, a connecting pipe and a filler flange. The outer sleeve is sleeved on the inner pipe. One end of the inner pipe passes through the outer sleeve and is inserted in the connecting pipe. The filler flange is sleeved on the inner pipe, with one end extending into the outer sleeve. The outer sleeve is provided with an annular inner boss on the inner surface. Gland packing is disposed between the annular inner boss and one end of the filler flange extending into the outer sleeve. The outer sleeve and the connecting pipe are integrally molded to form an integrated structure. An anti-impact plate is disposed between the gland packing and the annular inner boss. Wear-resistant carbon fiber layers are respectively disposed between the gland packing and the outer surface of the inner pipe and between the gland packing and the inner surface of the outer sleeve.

For convenient relative rotation between the inner pipe and the outer sleeve, the outer surface of one end of the inner pipe extending into the connecting pipe is provided with an annular outer boss, and a ball or a sliding ring is disposed in a cavity formed between the annular outer boss and the annular inner boss.

In order to further improve the sealing performance of the present invention, an end seal is disposed in the cavity formed between the annular outer boss and the annular inner boss.

In order to further improve the sealing performance of the present invention, an end seal is disposed in a cavity formed between the annular outer boss and the annular inner boss.

In order to avoid gaps generated due to normal wearing after long-term use of the gland packing from affecting the sealing performance of the whole rotary compensator, the outer sleeve can be provided with a stuffing filling device.

In order to prevent dislocation of the product in the reversed direction during the engineering installation process, displacement and falling of the ball disposed between the annular inner boss and the annular outer boss or displacement of the sliding ring and the end seal disposed between the annular inner boss and the annular outer boss, the connecting pipe is provided with a axially limiting structure inside.

In order to ensure the impact resistance of the anti-impact plate, the inner diameter of the anti-impact plate is 1-0.5 mm greater than the outer diameter of the inner pipe, and the outer diameter thereof is 1-0.5 mm smaller than the inner diameter of the outer sleeve.

The present invention achieves the following technical progress:

a. The outer sleeve and the connecting pipe are integrally molded to form an integrated structure, so the product does not need radiographic inspection, thoroughly solving the problems of difficult operation of weld flaw detection and even failure to perform the detection caused by the existing welding mode, improving product quality and safety, saving production cost, and enhancing productivity of products.

b. The wearing of the gland packing caused by the relative rotation of the outer sleeve and the inner pipe can be effectively avoided by configuration of the wear-resistant carbon fiber layers between the gland packing and the outer surface of the inner pipe and between the gland packing and the inner surface of the outer sleeve, thus reducing the losses of the sealing materials and enhancing the sealing performance of the whole rotary compensator.

c. The configuration of the anti-impact plate can effectively avoid media from impacting the gland packing, thus reducing losses of the sealing materials and further enhancing the sealing performance of the whole rotary compensator.

DESCRIPTION OF SEVERAL VIEWS OF THE ATTACHED DRAWINGS

Figure 2:
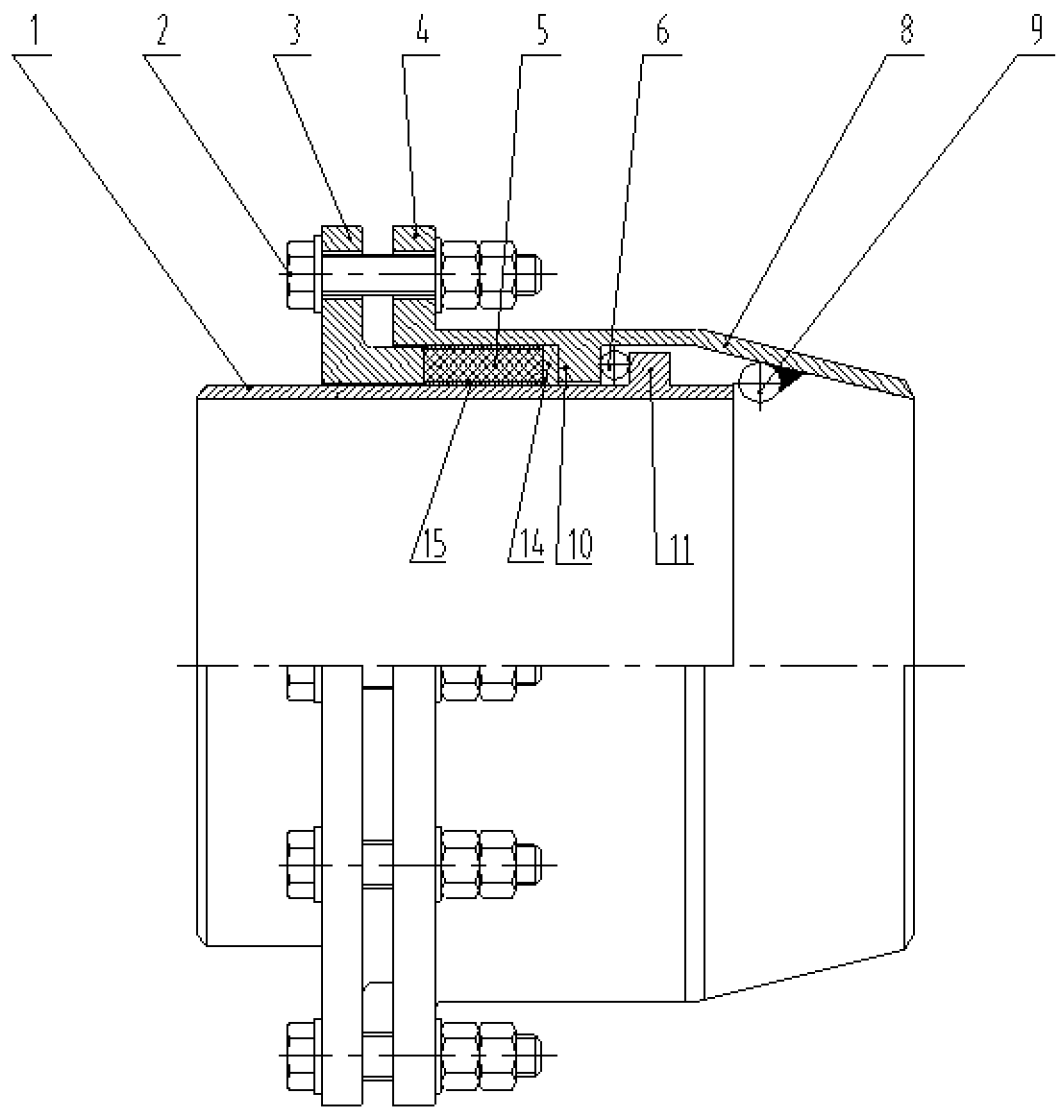
Figure 3:
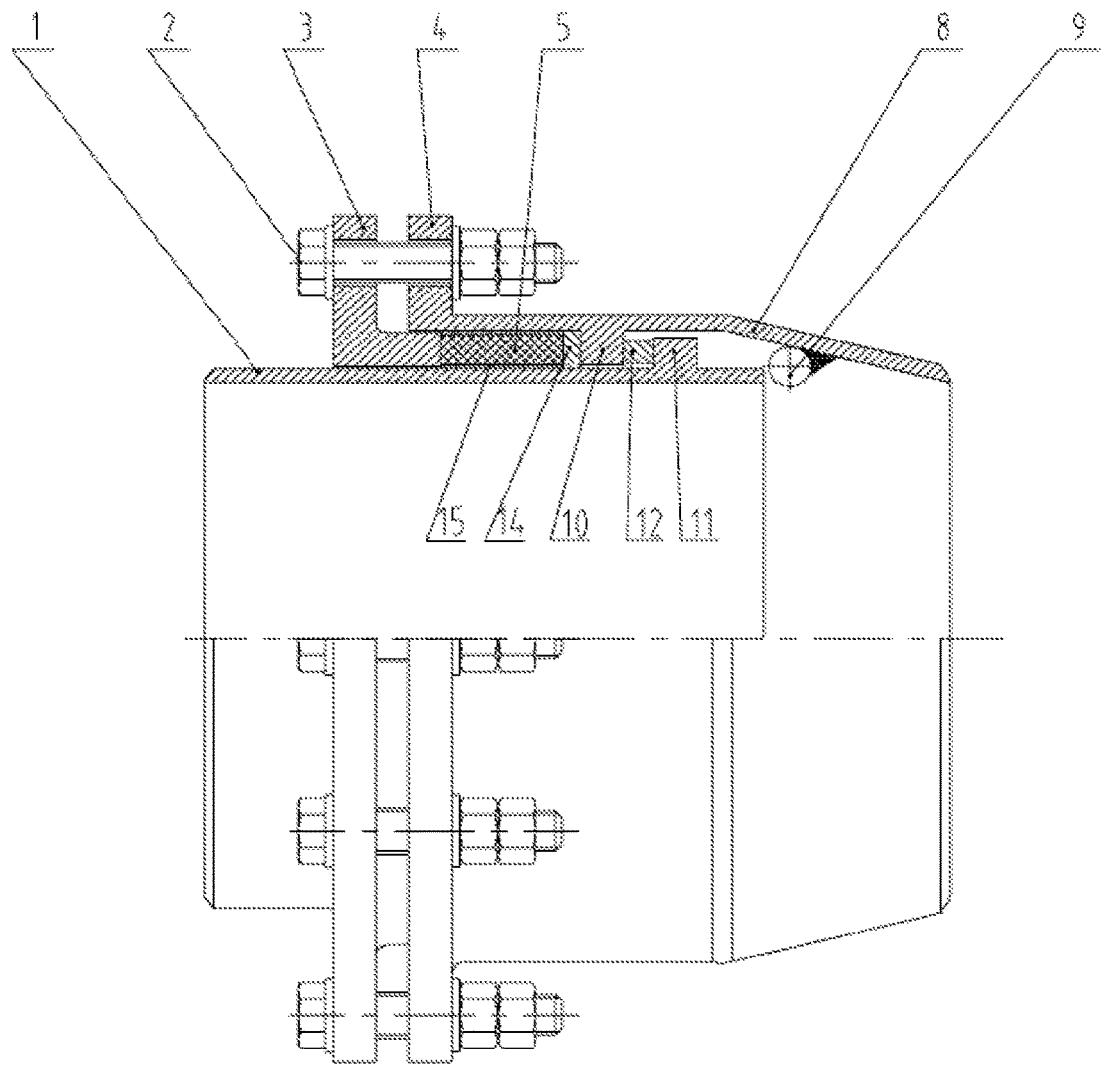
Figure 4:
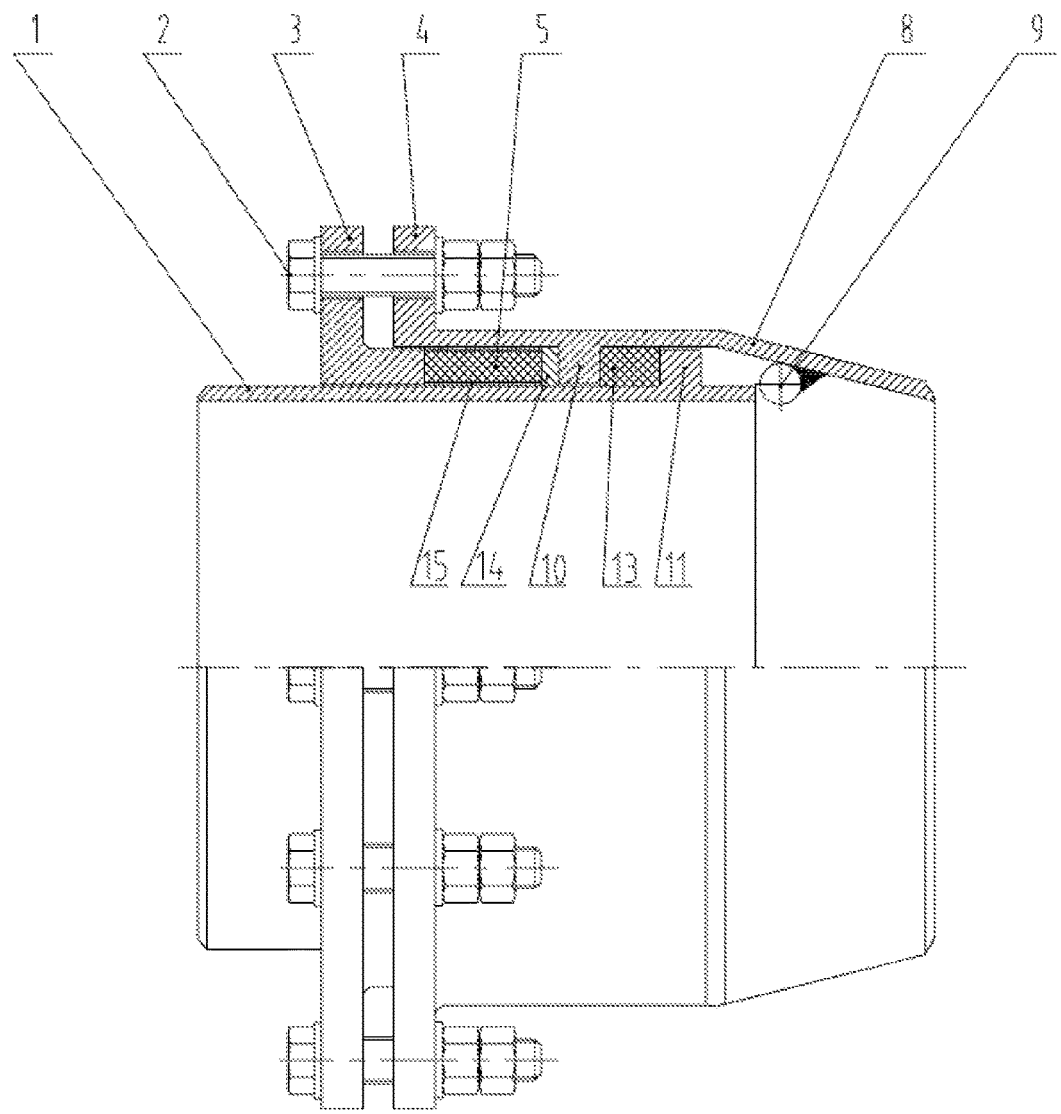
Figure 5:
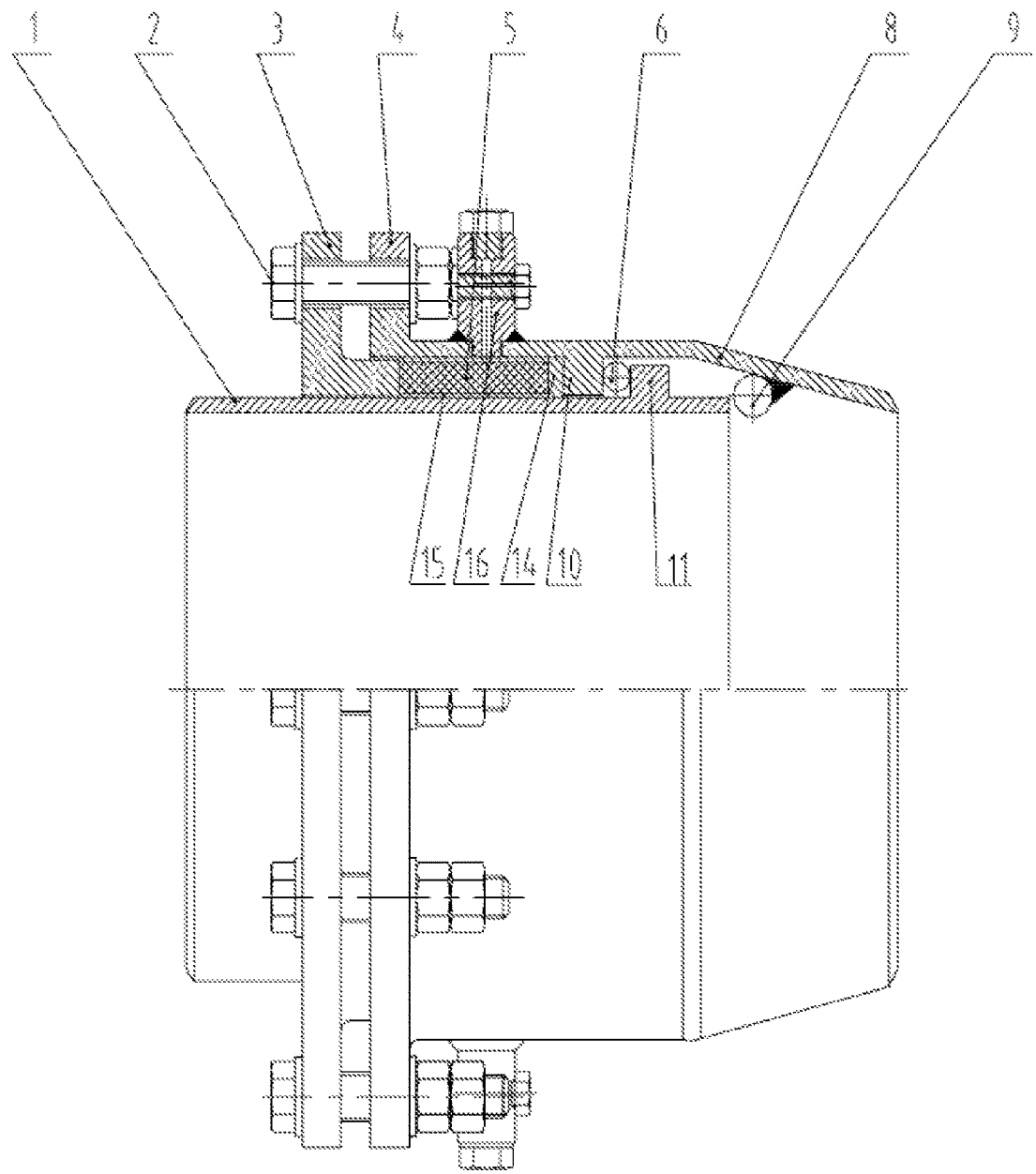

FIG. 1 is a structural view of the prior art.
FIG. 2 is a structural view of embodiment 1 of the present invention.
FIG. 3 is a structural view of embodiment 2 of the present invention.
FIG. 4 is a structural view of embodiment 3 of the present invention.
FIG. 5 is a structural view of embodiment 4 of the present invention.

DETAILED DESCRIPTION OF EMBODIMENTS

In FIGS. 1-5, marks are as follows: inner pipe 1, fastener 2, filler flange 3, outer sleeve 4, gland packing 5, ball 6, annular weld for connecting the outer sleeve and a connecting pipe 7, connecting pipe 8, axially limiting structure 9, annular inner boss 10, annular outer boss 11, sliding ring 12, end seal 13, anti-impact plate 14, wear-resistant carbon fiber layer 15, gland packing filling device 16.

Embodiment 1

As shown in FIG. 2, a high-pressure resistant integrated leak-free rotary compensator of this embodiment includes an inner pipe 1, an outer sleeve 4, a connecting pipe 8 and a filler flange 3. The outer sleeve 4 is sleeved on the inner pipe 1. One end of the inner pipe 1 passes through the outer sleeve 4 and is inserted into the connecting pipe 8. The connecting pipe 8 is a reducer pipe, and integrally molded with the outer sleeve 4 to form an integrated structure. The filler flange 3 is sleeved on the inner pipe 1, with one end extending into the outer sleeve 4. The outer sleeve 4 is provided with an annular inner boss 10 on the inner surface. Gland packing 5 is disposed between the annular inner boss 10 and one end of the filler flange 3 extending into the outer sleeve. An anti-impact plate 14 is disposed between the gland packing 5 and the annular inner boss 10 on the inner surface of the outer sleeve. Wear-resistant carbon fiber layers 15 are respectively disposed between the gland packing 5 and the outer surface of the inner pipe 1 and between the gland packing 5 and the inner surface of the outer sleeve 4. The filler flange 3 and the outer sleeve 4 are connected through a fastener 2.

The inner diameter of the anti-impact plate is 1-0.5 mm greater than the outer diameter of the inner pipe, and the outer diameter thereof is 1-0.5 mm smaller than the inner diameter of the outer sleeve.

For convenient relative rotation between the inner pipe 1 and the outer sleeve 4, one end of the inner pipe 1 extending into the connecting pipe 8 is provided with an annular outer boss 11, and a ball 6 is disposed in a cavity formed between the annular outer boss 11 and the annular inner boss 10 on the inner surface of the outer sleeve 4.

In order to prevent dislocation of the product in the reversed direction during the engineering installation process and displacement and falling of the ball, the connecting pipe 4 is provided with a axially limiting structure 9 inside.

Embodiment 2

As shown in FIG. 3, a high-pressure resistant integrated leak-free rotary compensator of this embodiment includes an inner pipe 1, an outer sleeve 4, a connecting pipe 8 and a filler flange 3. The outer sleeve 4 is sleeved on the inner pipe 1. One end of the inner pipe 1 passes through the outer sleeve 4 and is inserted into the connecting pipe 8. The connecting pipe 8 is a reducer pipe, and integrally molded with the outer sleeve 4 to form an integrated structure. The filler flange 3 is sleeved on the inner pipe 1, with one end extending into the outer sleeve 4. The outer sleeve 4 is provided with an annular inner boss 10 on the inner surface. Gland packing 5 is disposed between the annular inner boss 10 and one end of the filler flange 3 extending into the outer sleeve. An anti-impact plate 14 is disposed between the gland packing 5 and the annular inner boss 10 on the inner surface of the outer sleeve. Wear-resistant carbon fiber layers 15 are respectively disposed between the gland packing 5 and the outer surface of the inner pipe 1 and between the gland packing 5 and the inner surface of the outer sleeve 4. The filler flange 3 and the outer sleeve 4 are connected through a fastener 2.

The inner diameter of the anti-impact plate is 1-0.5 mm greater than the outer diameter of the inner pipe, and the outer diameter thereof is 1-0.5 mm smaller than the inner diameter of the outer sleeve.

For convenient relative rotation between the inner pipe 1 and the outer sleeve 4, the outer surface of one end of the inner pipe 1 extending into the connecting pipe 8 is provided with an annular outer boss 11, and a sliding ring 12 is disposed in a cavity formed between the annular outer boss 11 and the annular inner boss 10.

In order to prevent dislocation of the product in the reversed direction during the engineering installation process and displacement of the sliding ring 12, the connecting pipe 4 is provided with a axially limiting structure 9 inside.

Embodiment 3

As shown in FIG. 4, a high-pressure resistant integrated leak-free rotary compensator of this embodiment includes an inner pipe 1, an outer sleeve 4, a connecting pipe 8 and a filler flange 3. The outer sleeve 4 is sleeved on the inner pipe 1. One end of the inner pipe 1 passes through the outer sleeve 4 and is inserted into the connecting pipe 8. The connecting pipe 8 is a reducer pipe, and integrally molded with the outer sleeve 4 to form an integrated structure. The filler flange 3 is sleeved on the inner pipe 1, with one end extending into the outer sleeve 4. The outer sleeve 4 is provided with an annular inner boss 10 on the inner surface. Gland packing 5 is disposed between the annular inner boss 10 and one end of the filler flange 3 extending into the outer sleeve. An anti-impact plate 14 is disposed between the gland packing 5 and the annular inner boss 10 on the inner surface of the outer sleeve. Wear-resistant carbon fiber layers 15 are respectively disposed between the gland packing 5 and the outer surface of the inner pipe 1 and between the gland packing 5 and the inner surface of the outer sleeve 4. The filler flange 3 and the outer sleeve 4 are connected through a fastener 2.

The inner diameter of the anti-impact plate is 1-0.5 mm greater than the outer diameter of the inner pipe, and the outer diameter thereof is 1-0.5 mm smaller than the inner diameter of the outer sleeve.

In order to further improve the sealing performance of the present invention, the outer surface of one end of the inner pipe 1 extending into the connecting pipe 8 is provided with an annular outer boss 11, and an end seal 13 is disposed in a cavity formed between the annular outer boss 11 and the annular inner boss 10.

In order to prevent dislocation of the product in the reversed direction during the engineering installation process and displacement of the end seal 13, the connecting pipe 4 is provided with a axially limiting structure 9 inside.

Embodiment 4

As shown in FIG. 5, a high-pressure resistant integrated leak-free rotary compensator of this embodiment includes an inner pipe 1, an outer sleeve 4, a connecting pipe 8 and a filler flange 3. The outer sleeve 4 is sleeved on the inner pipe 1. One end of the inner pipe 1 passes through the outer sleeve 4 and is inserted into the connecting pipe 8. The connecting pipe 8 is a reducer pipe, and integrally molded with the outer sleeve 4 to form an integrated structure. The filler flange 3 is sleeved on the inner pipe 1, with one end extending into the outer sleeve 4. The outer sleeve 4 is provided with an annular inner boss 10 on the inner surface. Gland packing 5 is disposed between the annular inner boss 10 and one end of the filler flange 3 extending into the outer sleeve. An anti-impact plate 14 is disposed between the gland packing 5 and the annular inner boss 10 on the inner surface of the outer sleeve. Wear-resistant carbon fiber layers 15 are respectively disposed between the gland packing 5 and the outer surface of the inner pipe 1 and between the gland packing 5 and the inner surface of the outer sleeve 4. The filler flange 3 and the outer sleeve 4 are connected through a fastener 2.

The inner diameter of the anti-impact plate is 1-0.5 mm greater than the outer diameter of the inner pipe, and the outer diameter thereof is 1-0.5 mm smaller than the inner diameter of the outer sleeve.

For convenient relative rotation between the inner pipe 1 and the outer sleeve 4, one end of the inner pipe 1 extending into the connecting pipe 8 is provided with an annular outer boss 11, and a ball 6 is disposed in a cavity formed between the annular outer boss 11 and the annular inner boss 10 on the inner surface of the outer sleeve 4.

In order to ensure the sealing performance of the present invention, 4-30 filling openings are uniformly distributed along the same circumference at positions corresponding to the gland packing on the outer sleeve 4; a radial through-hole disposed in each filling opening runs through a traverse hole at the waist of the corresponding filling opening; the radial through-hole is provided with a plug at its outer end; and a plug installed in the traverse hole runs through the radial through-hole to form a gland packing filling device 16 with a valve structure. During use of the rotary compensator, if a leak occurs due to a decline in the sealing performance, the plug installed at the outer end of the filling opening and the plug in the traverse hole can be removed on line, and a pressure gun can be inserted into the filling opening to refill the gland packing. After the filling is completed, the plug installed in the transverse hole is fastened first; then, the pressure gun is removed; and next, the outer end of the filling opening is re-installed with the plug. In this way, the sealing performance of the rotary compensator can be recovered in time by refilling the gland packing on line.

In order to prevent dislocation of the product in the reversed direction during the engineering installation process and displacement and falling of the ball 6, the connecting pipe 4 is provided with a axially limiting structure 9 inside.

The invention claimed is:

1. A high-pressure resistant integrated leak-free rotary compensator, comprising
    an inner pipe, an outer sleeve, a connecting pipe and a filler flange;
    wherein
    the outer sleeve being sleeved on the inner pipe;
    one end of the inner pipe passing through the outer sleeve and being inserted into the connecting pipe;
    the filler flange being sleeved on the inner pipe, with one end extending into the outer sleeve;
    the outer sleeve being provided with an annular inner boss on the inner surface;
    a gland packing being disposed between the annular inner boss and one end of the filler flange extending into the outer sleeve, characterized in that,
        the outer sleeve and the connecting pipe are integrally molded to form unitary structure; an anti-impact plate is disposed between the gland packing and the annular inner boss; and wear-resistant carbon fiber layers are respectively disposed between the gland packing and the outer surface of the inner pipe and between the gland packing and an inner surface of the outer sleeve.

2. The high-pressure resistant integrated leak-free rotary compensator according to claim 1, characterized in that,
    one end of the inner pipe extending into the connecting pipe is provided with an annular outer boss, and a ball is disposed in a cavity formed between the annular outer boss and the annular inner boss.

3. The high-pressure resistant integrated leak-free rotary compensator according to claim 1, characterized in that,
    one end of the inner pipe extending into the connecting pipe is provided with an annular outer boss, and a sliding ring is disposed in a cavity formed between the annular outer boss and the annular inner boss.

4. The high-pressure resistant integrated leak-free rotary compensator according to claim 1, characterized in that,
one end of the inner pipe extending into the connecting pipe is provided with an annular outer boss, and an end seal is disposed in a cavity formed between the annular outer boss and the annular inner boss on the inner surface of the outer sleeve.

5. The high-pressure resistant integrated leak-free rotary compensator according to claim 1, characterized in that,
the outer sleeve is provided with a sealing filler filling device.

6. The high-pressure resistant integrated leak-free rotary compensator according to claim 1, characterized in that,
inside the connecting pipe is provided with axially position limiting structure.

7. The high-pressure resistant integrated leak-free rotary compensator according to claim 1, characterized in that,
the inner diameter of the anti-impact plate is 1-0.5 mm greater than the outer diameter of the inner pipe, and the outer diameter thereof is 1-0.5 mm smaller than the inner diameter of the outer sleeve.

* * * * *